US007387029B2

(12) United States Patent
Cunningham

(10) Patent No.: US 7,387,029 B2
(45) Date of Patent: Jun. 17, 2008

(54) APPARATUS FOR MEASURING TOTAL FORCE IN OPPOSITION TO A MOVING VEHICLE AND METHOD OF USING

(75) Inventor: Glen B. Cunningham, Newburyport, MA (US)

(73) Assignee: Velocomp, LLP, Ennis, MT (US)

( * ) Notice: Subject to any disclaimer, the term of this patent is extended or adjusted under 35 U.S.C. 154(b) by 293 days.

(21) Appl. No.: 11/234,330

(22) Filed: Sep. 23, 2005

(65) Prior Publication Data
US 2007/0186669 A1    Aug. 16, 2007

(51) Int. Cl.
*G01B 7/16*    (2006.01)
(52) U.S. Cl. .......................................... 73/781; 73/777
(58) Field of Classification Search .......... 73/760–856, 73/777–781
See application file for complete search history.

(56) References Cited

U.S. PATENT DOCUMENTS 4,478,629 A * 10/1984 Wood et al. .................. 65/163
5,123,671 A * 6/1992 Driessen et al. ......... 280/5.519
5,848,381 A * 12/1998 Ishii et al. ..................... 702/99
2006/0185429 A1* 8/2006 Liu et al. .................... 73/146.5

FOREIGN PATENT DOCUMENTS

JP    05-330028 A1    6/1995

* cited by examiner

*Primary Examiner*—Max Noori
(74) *Attorney, Agent, or Firm*—Michael W. Caldwell

(57) ABSTRACT

An apparatus is disclosed comprising a suite of sensors for measuring instant static and dynamic pressure and the speed and acceleration of a vehicle, such as a bicycle. A microprocessor receives data from the sensors and calculates power expended by the rider or other power source by finding the total of all forces impinging upon the vehicle and rider, thereafter multiplying by the speed of the ground vehicle. In some embodiments accuracy is improved by calibration techniques, user input of data, or temperature compensation of certain factors. Other data, such as wind speed, distance traveled, altitude, or surface grade may be presented to the user. In one embodiment data is stored for later analysis.

7 Claims, 15 Drawing Sheets

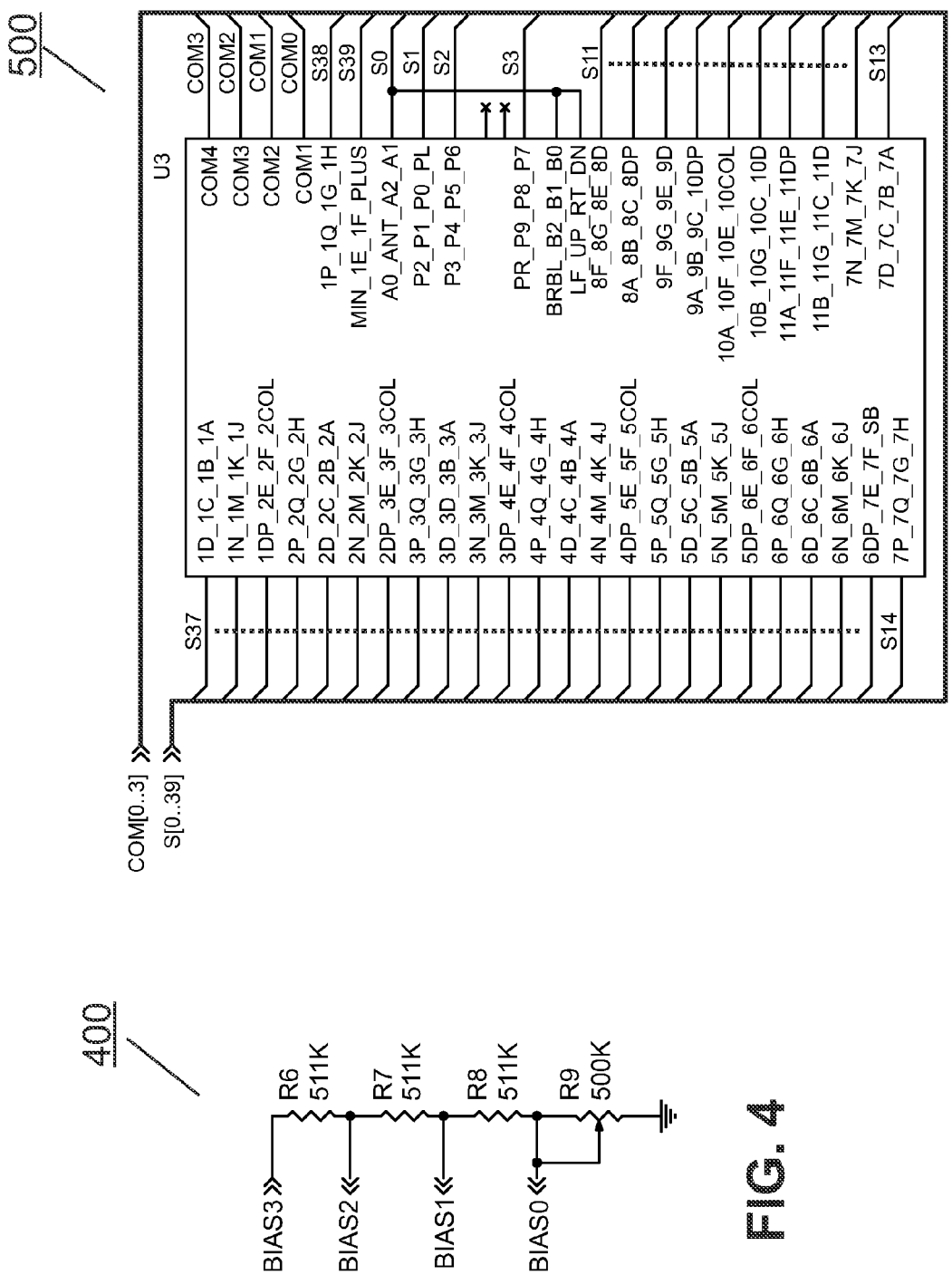

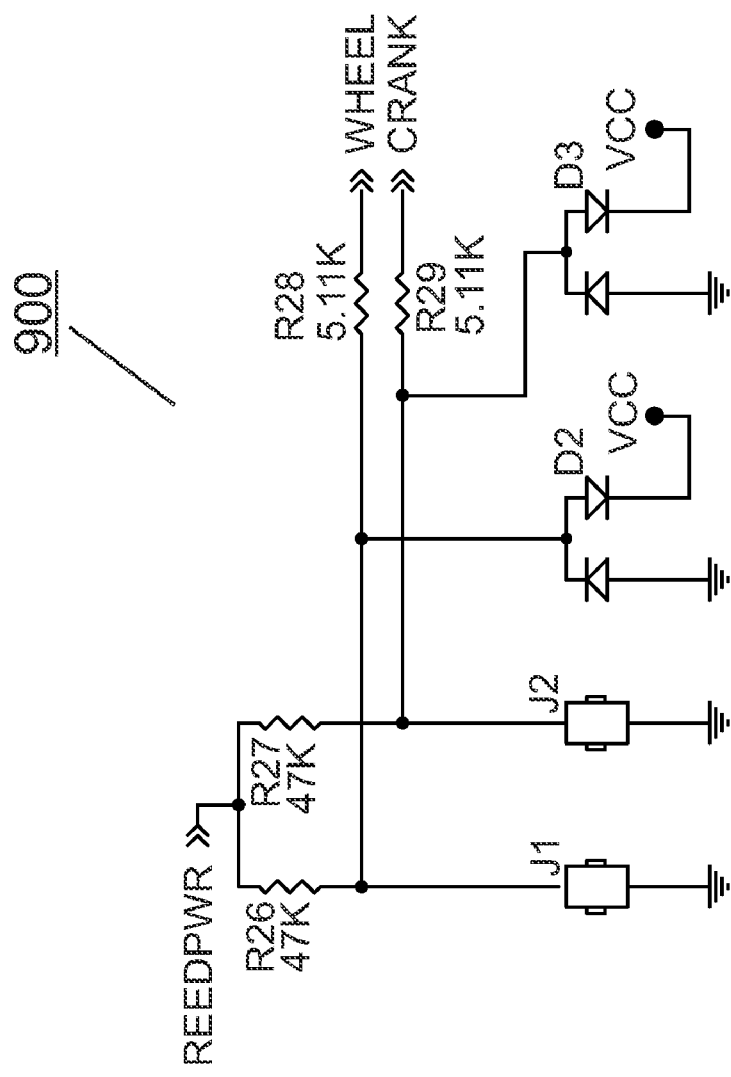
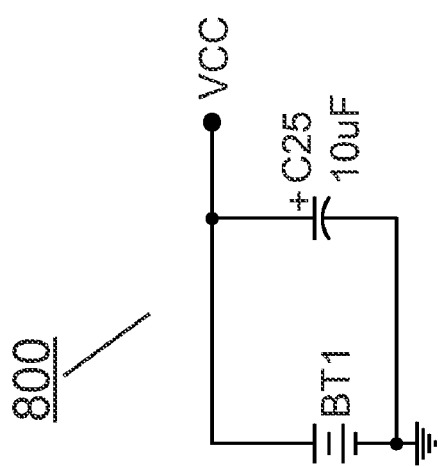
FIG. 9
FIG. 8

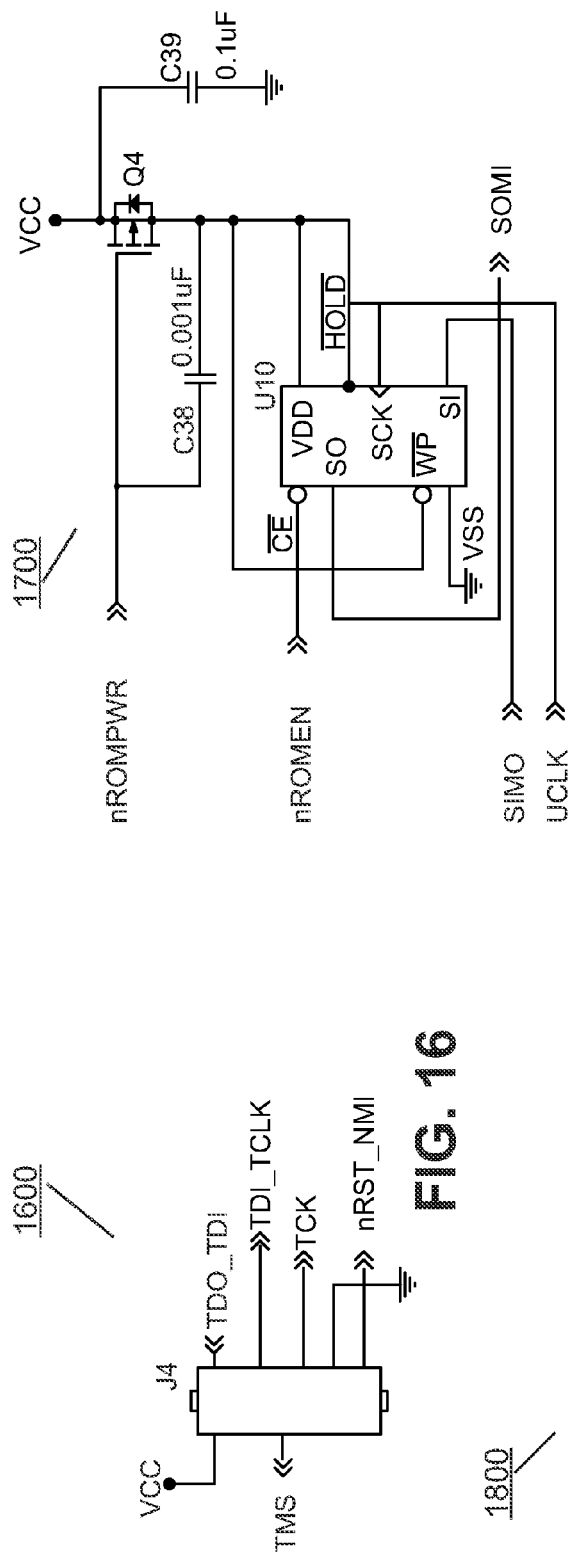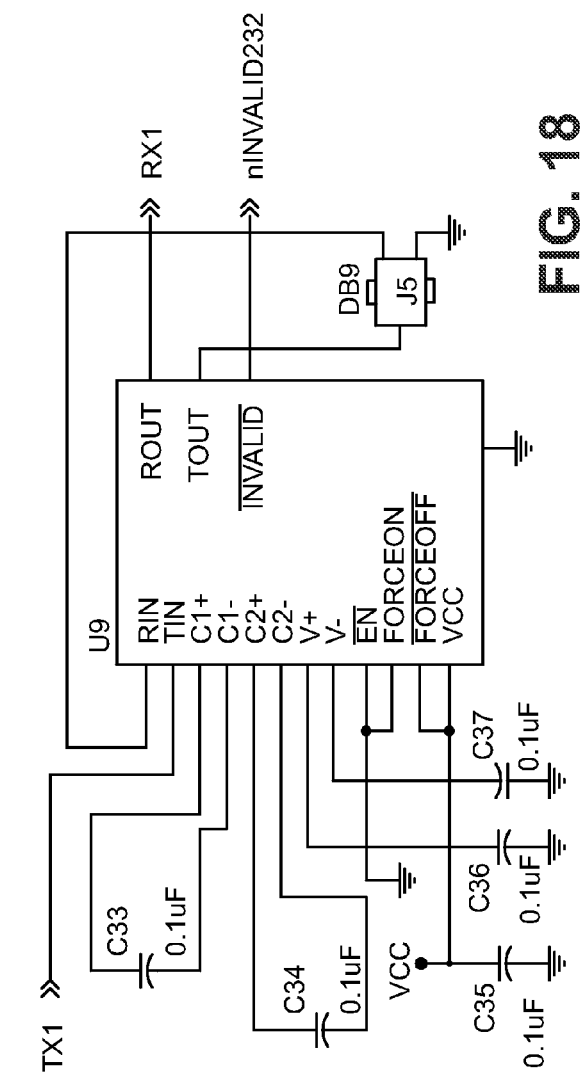

APPARATUS FOR MEASURING TOTAL FORCE IN OPPOSITION TO A MOVING VEHICLE AND METHOD OF USING

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF DISCLOSURE

The present disclosure of invention relates generally to devices for measuring the performance of vehicles, and more particularly for reporting performance parameters to the user.

BACKGROUND

Human powered vehicles, such as bicycles, often have indicators of performance, from a simple speedometer to sophisticated computers which report such data as distance, average and instantaneous speed, and such. Most depend upon simple manipulation of data derived from wheel speed and number of rotations. GPS products have added the notion approximate altitude, location, navigation, even tracking. Some products, such as heart monitors, report performance or status of a human powering the vehicle.

It is also desirable to measure performance indications such as the power produced and the total energy expended. As athlete training continues to be more and more sophisticated, some training is conducted indoors under controlled conditions, where typically large or stationary equipment is used. However many athletes and trainers want to monitor performance in real time under actual conditions. Some products measure pedal torque, power output and energy expended by direct or indirect measurements of the forces that the rider is applying to drive a vehicle forward. Examples include mechanical strain gauges installed in crank mechanisms or wheel hubs to measure the applied forces and speeds, and thus derived indications corresponding to power and energy.

The prior art includes solutions wherein expensive sensors are installed in the crank or rear hub of a bicycle. Many such systems require the user to use a customized crank or hub, which is difficult to install or move to another vehicle, often requiring installation by a trained technician.

SUMMARY

The disclosure of the present invention describes a novel approach to the determination of the amount of power produced and energy expended by a rider. Rather than measuring the forces that a rider applies to a vehicle, the present invention determines the forces that oppose the vehicle, which the rider must overcome. According to Newton's Third Law, the sum of these forces is equal and opposite to the forces applied by the rider. These opposing forces include gravity, aerodynamic drag, inertia and friction.

To determine the various forces which oppose movement of the vehicle, the present invention provides a suite of sensor data. An accelerometer provides data related to changes in velocity (vehicle acceleration) and gravitational forces (hills). When used in conjunction with changing ground speed data, the gravitational acceleration may be separated from the total acceleration, allowing the slope of the vehicle path to be determined and displayed. A differential pressure sensor provides information on the aerodynamic pressure applied against the front of the vehicle, and this is used to calculate the total opposing aerodynamic force. In some embodiments a barometric pressure sensor is used to measure instant altitude and changes in altitude. In one embodiment the barometric pressure and air temperature data are used to estimate air density to derive an estimated relative wind speed from the wind pressure measurements.

In some embodiments the calculations to derive forces from an accelerometer and wind pressure information are improved by input from the user or through calibration procedures. For example, the acceleration data is combined with the known or assumed total weight of the vehicle and rider to determine the force due to acceleration (vehicle acceleration and/or climbing or descending). Aerodynamic forces are calculated from aerodynamic pressure measurements combined with aerodynamic drag and area terms, which in some embodiment are improved by measurements from a coast-down procedure. Frictional forces may be estimated, assumed, entered by a user, or measured by a coast-down calibration procedure.

The sensors described by the disclosure of the present invention are used by a microcomputer, which in turn calculates certain performance and status information. The results are presented to the user, and/or may be recorded for later analysis. The unit is small, light weight, and inexpensive. It is also self contained such that it may conveniently be moved from one vehicle to another and allows the user to continue using stock components, such as crank and hub.

BRIEF DESCRIPTION OF THE DRAWINGS

FIG. 4 is a schematic of a circuit providing bias voltages for a liquid crystal display device.

FIG. 5 is a schematic of an interface to a liquid crystal display device.

FIG. 8 is a schematic of a battery supply to the system of the invention.

FIG. 9 is a schematic of a circuit which provides timing data from a crank or from a wheel.

FIG. 16 is a schematic of a JTAG interface to an MCU.

FIG. 17 is a schematic of a nonvolatile storage system.

FIG. 18 is a schematic of a serial communications interface to an MCU.

DESCRIPTION OF SOME EMBODIMENTS

Table 1 provides some Acronyms, and Abbreviations as may be used in the detailed description.

TABLE 1

| | |
|---|---|
| ADC | Analog to digital converter |
| AVCC | Positive DC voltage supplied to analog components |
| GPS | Global Positioning System. A technology which provides location and certain other data based upon received satellite signals. |
| LCD | Liquid crystal display |
| MCU | Microcontroller or microprocessor |
| MEMS | Micro-electro-mechanical system integrated circuit |
| MUX | Multiplexer |
| VCC | Positive DC voltage supplied to digital components |
| Pitch | Angle of the surface under the vehicle, in the direction of travel, relative to a level surface |
| Pt | Total pressure |
| Ps | Static pressure |
| Q | Dynamic pressure; (Pt − Ps) |
| R | Gas constant: .286 KJ/kg/degree Kelvin |
| Roll | Angle of the vertical axis of the vehicle, orthogonal to the direction of travel. |
| G or g | Symbol for acceleration, wherein one G is defined as the gravitational pull of the earth at the equator. |
| $\rho$ | Density of air; =Ps/(RT) |
| T | Absolute temperature (degrees Kelvin) |
| V or v | Vehicle velocity |

The present invention is described as implemented on a bicycle as an example. It is applicable to any vehicle, such as an aircraft, boat, or others, whether powered by a human or another power source. The term "vehicle" as used throughout this disclosure may include a human that is using the vehicle device. For example, the drag coefficient of a bicycle "vehicle" would include the effect of a rider.

The present invention comprises sensors to measure wheel rotation, crank arm rotation, acceleration, air temperature, absolute and differential ambient air pressure, an MCU to control system operation and to collect and process sensor data, an LCD to display user information, switches to accept user control inputs, and a battery to supply DC power for circuit and sensor operation.

This disclosure describes an embodiment of the present invention wherein all of the described modules are employed. This description should not be considered limiting, in that the invention encompasses subset embodiments wherein some user feature(s), accuracy, or both may be diminished for cost or other reasons. For example, some embodiments do not include crank rotation sensors, thus not providing cadence information in that manner. Others will be obvious to one skilled in the relevant art. All such embodiments are practice of the present invention.

Figure 1:
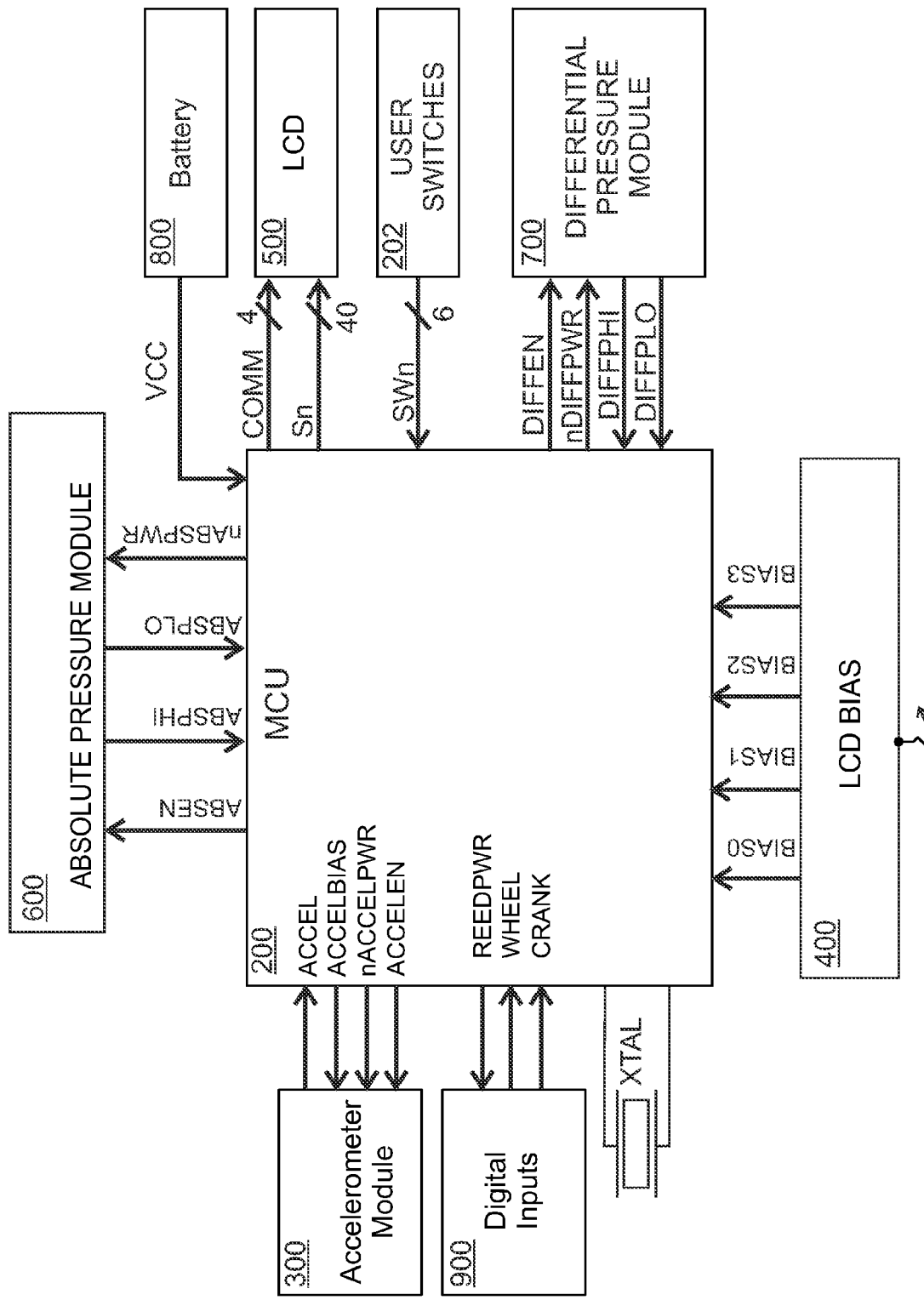
FIG. 1 is a top level schematic, indicating the connections between major functional blocks of one embodiment of the invention.

Connections between the functional blocks comprising one embodiment of the invention are shown in FIG. 1. In one embodiment MCU 200 is a low-power microcontroller with an integrated multiplexed 12-bit ADC and an LCD driver/controller. Input ports on the MCU accept inputs from switches, sensors with contact-closure outputs which provide timing signals, and sensors with analog outputs related to air pressure and acceleration. Timer functions associated with some input ports are used to debounce switch and contact closure inputs and to calculate rotation rates. The MCU selectively enables or disables sensors and/or the LCD display to reduce power consumption and extend battery life. In some embodiments the MCU also includes an internal temperature sensor and supply voltage sensor. In one embodiment a temperature reading is used to correct sensor readings which can drift with temperature changes and for estimating air density.

There are many MCUs in the industry that are suitable for practicing the invention. Alternatives may include more or fewer on-chip functions. MCU 200 described herein is for illustrative purposes. One skilled in the art will understand that some functions and features ascribed to the MCU may be implemented with a different system partitioning of on or off chip, such as an external ADC. The embodiment described herein is representative of a certain complement of features and functions. The present invention includes alternative embodiments that incorporate more or fewer end-user features.

Figure 2:
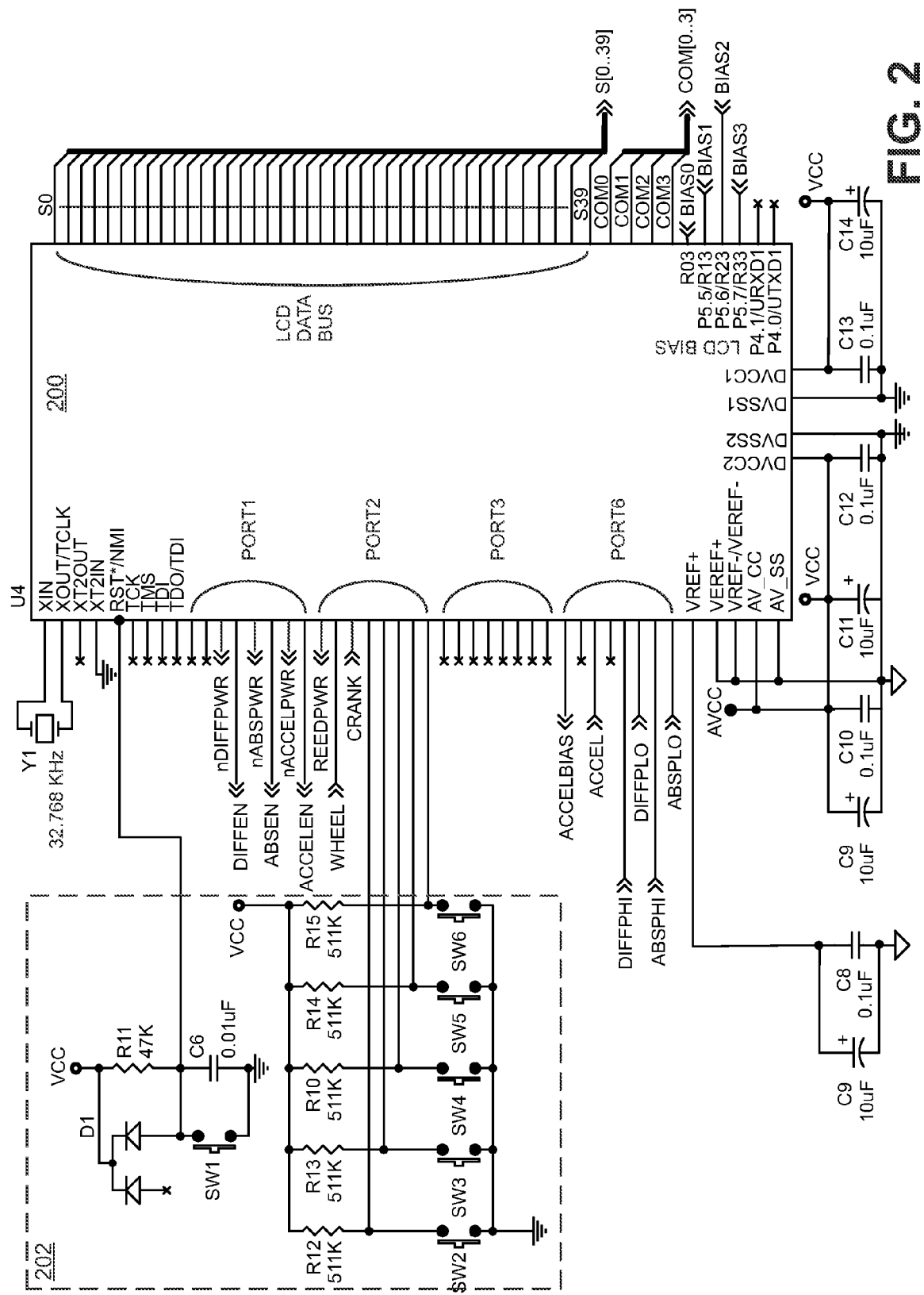
FIG. 2 is a schematic showing connections to a microcontroller in the present invention.

FIG. 2 details connections to the MCU 200. Lines S0 to S39 provide LCD segment output drive signals to segment input lines on LCD 500. Lines COM0 to COM3 connect with the common (backplane) input lines on LCD 500. Lines BIAS0 to BIAS3 provide various voltages needed to generate the segment and common signals to the LCD. Other displays may have more or fewer segment and common signals. Other display technologies, such as LED, may also be utilized instead of LCD. In one embodiment certain words and symbols are printed on the case and one or more LEDs or LCD segments are used to indicate a certain word or symbol. In one embodiment crystal Y1 provides a 32,768 Hz time base from which all MCU system clock and timing functions are derived.

User switches SW1 through SW6 202 provide for command input and system reset by the user. Switch SW1, diode D1, resistor R11, and capacitor C6 provide a reset network. Application of battery voltage to terminal VCC or closure of switch SW1 asserts line RST*, forcing the MCU to reset and restart. The values of resistor R11 and capacitor C6 are selected to achieve the desired duration of reset pulse width in accordance with the specification of a selected MCU. A typical keypad input arrangement for user interface is connected to port 2. The MCU periodically reads port 2 terminal logic states to execute the system function associated with the depressed switch. If available, input interrupt circuits in the MCU may detect changes in the switch states and alert the processor.

In some embodiments power consumption is minimized by selectively powering various portions of the system only when needed. In the example shown the differential pressure module 700 is powered in response to signal nDIFFPWR, the absolute pressure module 600 is powered in response to signal nABSPWR, and the accelerometer module 300 is powered in response to signal nACCELPWR.

The MCU asserts signal DIFFEN to enable differential pressure module 700 differential amplifier 702 and releases signal DIFFEN to place differential amplifier 702 in low-power mode. Lines DIFFPHI and DIFFPLO are connected to the ADC MUX of the MCU.

The absolute pressure module 600 provides absolute pressure measurements for air density and altitude calculations. The MCU asserts signal ABSEN to enable absolute pressure module 600 differential amplifier 602 and releases ABSEN to place differential amplifier 602 in low power mode. Lines ABSPHI and ABSPHLO are connected to the ADC MUX of the MCU.

The MCU asserts signal ACCELEN to enable acceleration module amplifier U2A 302 and releases ACCELEN to place amplifier U2A 302 in low power mode. Signal ACCELBIAS, under the control of the MCU as described later, controls the bias to amplifier U2A 302. Line ACCEL from accelerometer module 300 is connected to the ADC MUX of the MCU.

Line WHEEL provides contact closure pulse signals responsive to a wheel rotation sensor to a digital input of the MCU. The MCU measures the time between pulses to calculate vehicle ground speed. Ground speed calculations are used by the MCU to distinguish between ACCEL signals resulting from vehicle velocity changes and ACCEL signals resulting from pitch of the vehicle. In one embodiment a ground speed sensor, such as one based upon Doppler radar or GPS satellite data, provides ground speed data. In some embodiments position data is provide by a module, such as a GPS satellite module, and ground speed is calculated by dividing the distance traveled between data points by the time elapsed between the data points.

Line CRANK provides contact closure pulse signals responsive to a crank rotation sensor to a digital input of the MCU. The MCU measures the time between pulses to calculate pedaling rate ("cadence").

FIG. 2 also illustrates a typical method of reducing the effect of noise on digital and analog power supplies. The specific design will depend upon the MCU selected to practice the invention, printed circuit board layout, and other factors.

Figure 3:
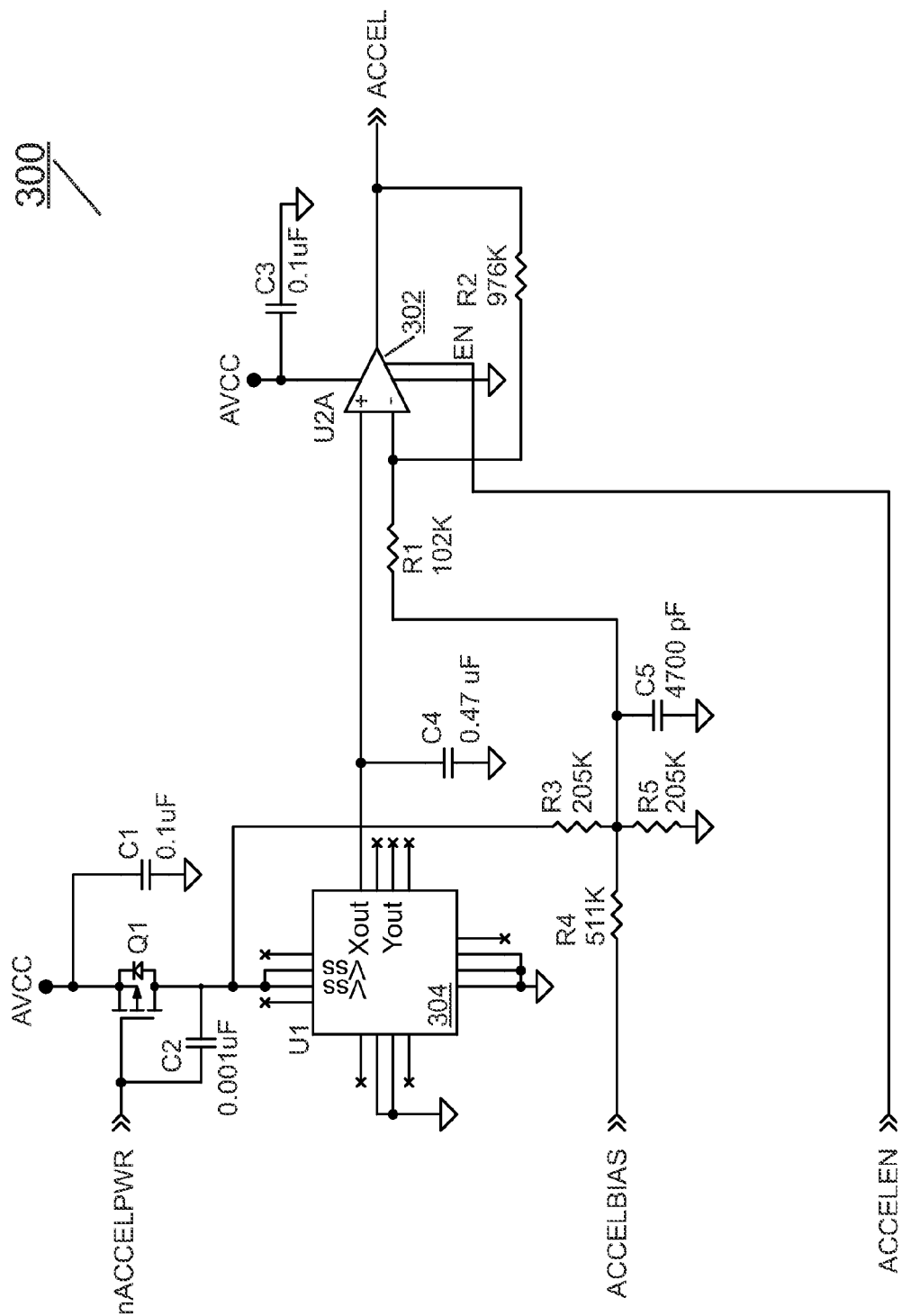
FIG. 3 is a schematic of a module which provides signals related to acceleration of a vehicle.

FIG. 3 illustrates details of one embodiment of accelerometer module 300. U1 304 is an integrated MEMS circuit that provides a voltage signal approximately linearly related to acceleration. Other accelerometers are available, such as piezoelectric, a ball bearing or mercury in a curved track, and such. Sensor U1 304 is mounted parallel to the plain of the surface under the vehicle with one axis (x-axis) in the direction of travel of the vehicle. One output signal is responsive to the pitch of the vehicle and the other output signal is responsive to roll. In the embodiment shown only the pitch (or X) axis is used. The angle of pitch is determined by measuring the acceleration due to the pull of gravity. When the system is level and still, there is no gravitational force along the X axis of the sensor, therefore the accelerometer signal is related to zero g. The accelerometer provides approximately AVCC/2 when there is no acceleration; that is, zero g. This is termed the "zero g bias voltage". For the case of a positive acceleration due to a tilt or change in speed, the voltage will rise above the zero g bias voltage in proportion to the acceleration. Negative acceleration due to downward tilt or slowing of the vehicle will produce a voltage below the zero g bias, again in proportion to the acceleration. For example, consider an acceleration of 0.05 g and, based on the wheel speed sensor data, with the vehicle decelerating at a rate of 0.01 g. The net acceleration due to tilt is found as: 0.05−(−0.01)=0.06 g. This corresponds to a slope angle of arcsin(0.06)=3.44 degrees up. The sensor cannot tell the difference between tilt and motion acceleration, but we can calculate the motion component and thus separate them. If the vehicle pitches up or down, gravity will apply an acceleration force according to the angle of the gravity vector (pitch angle) and the sensor U1 will produce a nonzero g output.

The output of U1 304 varies ratiometrically with the supply voltage. Zero acceleration provides an output of approximately half of the supply voltage, with some offset due to production variations. The resistor divider formed by R3 and R5 (FIG. 3) provides a bias voltage of half of the supply voltage. The bias and sensor outputs are compared and amplified by a differential amplifier U2A 302. The output of amplifier U2A 302 is also ratiometric and offset by half of the supply voltage. For example, with a 3V battery supply, the output will be approximately 1.5V for no sensed acceleration and will increase or decrease with positive or negative pitch angles.

Amplifier U2A 302 has a differential gain of about 5.8. The amplifier output terminal is connected to the ADC through the MUX of the MCU. The ADC input range also varies ratiometrically with supply voltage, therefore the resolution of acceleration by the system expressed in units of g per bit is constant, regardless of supply voltage.

Amplifier U2A 302 gain is selected to optimize the sensitivity of the circuit while allowing an acceptable range of minimum and maximum acceleration readings. Since production variations of the range of output values in a given MEMS accelerometer can be significant, R4 and the ACCELBIAS signal are provided to modify the inverting amplifier U2A 302 terminal bias to accommodate accelerometer zero bias offsets. ACCELBIAS is driven by a tri-state output terminal of the MCU and thus the output terminal may float or be driven to VCC or ground. When ACCELBIAS is floating, R4 will have no effect and the offset will be AVCC/2 as determined by R3 and R5. When ACCELBIAS is driven to ground, R4 will act in parallel with R5, providing a bias voltage of (5/12)*AVCC. Similarly, if ACCELBIAS is driven high, then the bias voltage will change to (7/12)*AVCC. This accommodates the full range of possible offsets specified for the accelerometer component used in the example shown.

FIG. 4 shows details of LCD BIAS 400. The LCD driver integrated into the MCU specifies four voltage levels to display viewable segments on an LCD. The LCD bias adjustment circuit provides the voltage levels through a simple voltage divider resistor ladder comprising resistors R6 to R9. Variable resistor R9 permits user adjustment of bias voltages to modify the LCD contrast and viewing angle, which may change due to temperature, battery voltage, or ambient light. In some embodiments R9 is replaced with a network of thermistors and other discrete components to provide automatic temperature and voltage compensation.

FIG. 5 shows connections from the MCU to an LCD with 40 segment lines and four common lines for a maximum of 160 individual display elements. Display elements may be arranged into numeric digits, bar graphics, symbols, and/or text characters. The MCU controls display elements on the LCD to present information of interest to the user, such as vehicle speed, distance traveled, time of day, road surface slope, relative wind speed and wind pressure, or power and energy calculations such as calories per hour, accumulated calories consumed, power output in watts, and the like.

Figure 6:
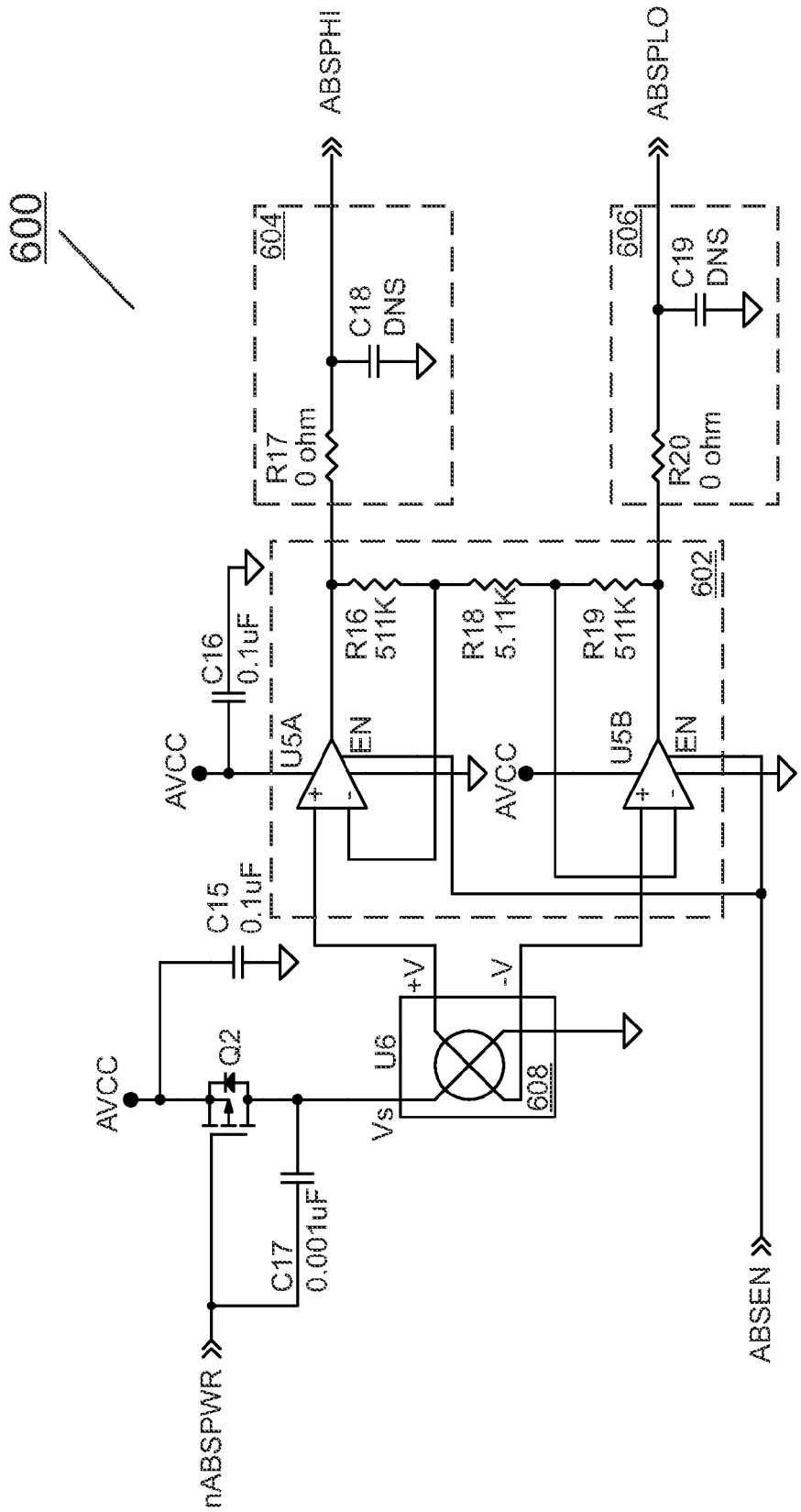
FIG. 6 is a schematic of a module which provides signals related to absolute pressure.

One embodiment of the invention includes an absolute pressure module 600 to provide barometric pressure (Ps). FIG. 6 illustrates the schematic details. In one embodiment Ps is calibrated and cross checked with pitch angle data from the accelerometer module to provide more accurate readings of altitude and altitude change than from either sensor alone. Updated barometric data is collected during a ride to recalculate air density, thereby providing corrected parameters for improved relative wind speed calculations. Air temperature is measured with an internal temperature sensor in the MCU, with an external temperature sensor, or may be entered by the user. In one embodiment, altitude information is provided by a GPS module.

In one embodiment, the absolute pressure module is omitted from the system and barometric pressure is estimated from temperature and altitude changes derived from pitch and speed sensors and user input of starting altitude. Air density (ρ) and other calculations dependent on barometric pressure may have better accuracy when absolute pressure module 600 is included.

Absolute pressure sensor U6 608 generates an approximately zero volt differential between sensor U6 output terminals +V and −V at zero pressure (complete vacuum), and a positive differential voltage for nonzero atmospheric pressures. As ambient pressure decreases in response to an actual rise in elevation or to atmospheric changes, the differential output voltage from sensor U6 608 decreases. If the pressure rises, the differential voltage increases. The sensor U6 608 component selected must take into account the maximum and minimum pressure readings possible, functions of the maximum and minimum design altitude for the system. The barometric pressure is provided to pressure sensor U6 608 by air tight passages between the sensor and a hole in an enclosure, the hole oriented so as to be orthogonal to the direction of travel of the vehicle. Alternatively, the static port of a pitot tube may be connected to pressure sensor U6 608 by an air tight passage.

The differential voltage across sensor U6 608 terminals +V and −V is applied to the high impedance inputs of differential amplifier 602, comprised of two operational amplifiers U5A and U5B and resistors R16, R18, and R19. The difference of the output signals of operational amplifiers U5A and U5B is approximately proportional to the difference of the inputs, with a gain of about 201 for the resistor values shown. The average of the two differential output voltages from differential amplifier 602 will be the same as the average of the inputs, equal to the common mode bias voltage of the sensor, typically near AVCC/2. Differential amplification causes one output to go up and the other to go down by equal amounts. If the differential input is zero, i.e., the two inputs are the same, the two outputs will also be the same. When pressure is applied the inputs will spread out, one going higher and one going lower from the common mode or average voltage of the two. As an example, given inputs of 1.501 and 1.499 (2 mV differential), with a gain of 201 the outputs would be 1.701 (1.5+201*.001) and 1.299V. The output differential are 1.701−1.299=402 mV or 201 times the 2 mV input differential. The common mode voltage or average voltage of the two outputs are (1.701+1.299)/2=1.500V, same as the input.

RC low pass filters 604 and 606 remove high frequency noise from the outputs of differential amplifier 602. The filtered differential signals are connected with MCU 200 on lines ABSPHI and ABSPHLO. In some embodiments, low pass filters 604 and 606 are not used (that is, ABSPHI and ABSPLO are the unfiltered output of differential amplifier 602). In either case, digital signal processing firmware within the MCU may also perform signal filtering.

In the example embodiment shown the differential voltage (ABSPHI-ABSPHLO) changes ratiometrically with battery supply voltage. Since the ADC input range also varies ratiometrically with battery supply voltage, the ADC count output will be approximately the same for a given pressure regardless of the supply voltage. In one embodiment the battery supply is regulated and the ADC is provided a reference voltage source.

MCU 200 calculates the absolute pressure by digitally sampling the signals on lines ABSPHI and ABSPLO and subtracting the two numerical values received from the ADC. The resulting difference is then scaled and corrected to take into account offsets and variations in circuit gain and sensor sensitivity as determined during calibrations.

The circuit for differential pressure module 700 is nearly identical to absolute pressure module 600. Differential amplifier 702 has a gain of 1820. Sensor U8 708 is connected with two pressure ports versus sensor U6 608, which is connected with one pressure port.

Differential pressure is used to measure the dynamic air pressure against the front of the vehicle. Sensors measure the difference between two pressure input ports. The pressure input ports are holes in the system encasement which are connected with the pressure sensors by air tight passages. A first pressure input port faces the direction of travel and the air pressure (Pt) is connected to one side of pressure sensor U8 708 via an air tight passage. A second pressure input port is located on the side of the system encasement such that it receives static or atmospheric pressure (Ps). The atmospheric pressure is connected to a second side of pressure sensor U8 708 and to pressure sensor U6 608 by air tight passages. In some embodiments Pt and Ps are provide to the pressure sensor(s) by air tight passages connected to a pitot tube. Pressure sensor U8 708 senses the difference between the two pressure values, the difference being defined as "dynamic pressure" (Q), and is due to the movement of the vehicle through the air. The total force against the vehicle is related to the dynamic pressure, the drag coefficient, and the frontal area. That portion of total power required to move the vehicle through the air is calculated based upon this force and the vehicle speed.

In the embodiment shown sensor U8 708 includes two pressure input ports, sensing the differential pressure directly. In another embodiment a first sensor senses Ps and a second sensor senses Pt. The output signal of each sensor is connected to the ADC MUX. The ADC converts each of the two output signals separately and provides the digital result to the MCU. The MCU calculates the dynamic pressure by subtracting Ps from Pt. Other configurations of differential pressure measurement are known to those skilled in the art.

According to Bernoulli's equation the dynamic pressure is $$Q = (P_T - P_S) = \frac{\rho V^2}{2}.$$

Since the density of the air is known or can be estimated, the relative wind speed can be calculated from the dynamic pressure. Rearranging terms, we find the wind speed as:

$$V = \sqrt{\frac{2*Q*RT}{P_S}}.$$

Since the pressure system has no knowledge of ground speed, this represents relative wind speed. Comparing relative wind speed to vehicle ground speed (found from wheel rotations) we get wind ground speed.

Figure 7:
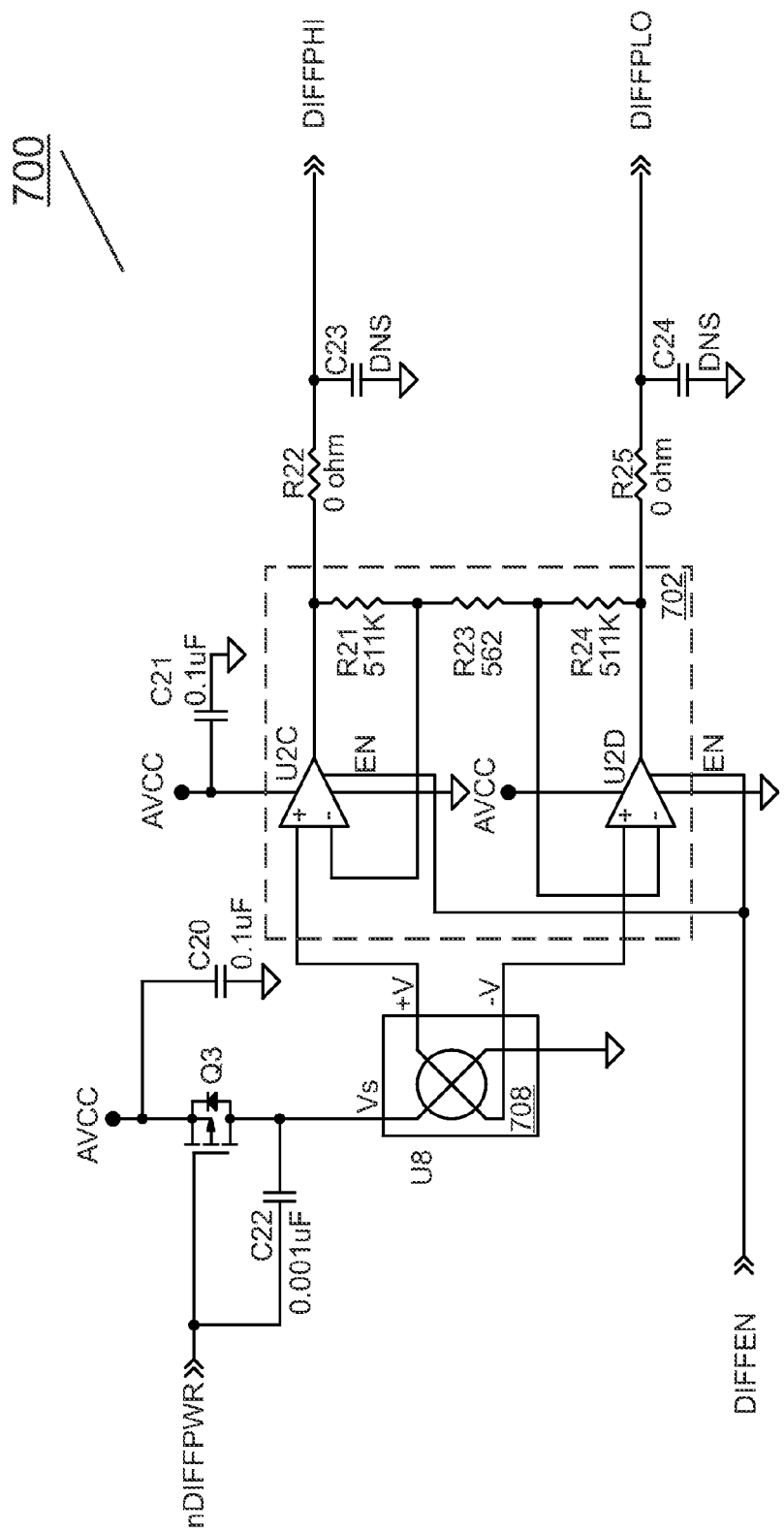
FIG. 7 is a schematic of a module which provides signals related to differential pressure.

In one embodiment differential pressure module 700 is designed for operation over a pressure range of +/−10 kPa for good resolution of low pressure signals. The gain and sensitivity of differential pressure module 700 optimize the measurement range and measurement resolution over the expected range of vehicle operating speeds. Using the configuration and values indicated in FIG. 7, differential pressure module 700 will measure air speeds of more than ninety mph without saturating amplifiers U2C and U2D. Other sensors may be selected for different operating ranges.

The MCU digitally samples the signals provided by lines DIFFPHI and DIFFPLO and subtracts the two numerical values returned by the ADC conversions. The difference is scaled and corrected to take into account offsets and variations in circuit gain and sensor sensitivity as may be determined by calibrations.

Vehicle speed changes are used to distinguish acceleration resulting from vehicle velocity changes from acceleration resulting from vehicle pitch. A typical method in the art measures the time period between complete wheel rotations by attaching a magnet or other target to the vehicle wheel and a magnetic switch or other target sensor switch to an adjacent, fixed point on the vehicle. Each time the target passes the switch the time period since the last switch closure is noted. The period is converted to the number of closures per unit time, then scaled by the wheel circumference to calculate vehicle speed. The switch may be a reed switch, a Hall effect sensor, an optical sensor or any sensor that provides timing signals related to wheel revolutions. In some embodiments changes in wheel speed are measured more frequently by providing multiple magnets on the wheel to be detected by the switch. Similarly, a component on the crank arm of the bicycle coupled with a stationary sensor on the bicycle frame may provide a measurement of crank revolutions per minute. In one embodiment the cadence is used to find average crank torque or pedal force as a function of power. In some embodiments the MCU calculates wheel speed by counting the number of target pulses received during a certain time period.

FIG. 8 details a typical battery supply 800. Other portable energy sources, such as solar power, may also be used.

FIG. 9 illustrates one embodiment wherein magnetic sensors are used. When signal REEDPWR is driven high by the MCU, signals WHEEL and CRANK are also pulled high through pull-up resistors R26 and R27. Each time a wheel magnet passes the magnetic switch J1, switch J1 closes momentarily and signal WHEEL is pulled down to ground. Signal CRANK is pulled to ground each time a crank magnet passes switch J2. The MCU marks the time of each low pulse event and calculates speed, distance, or cadence. Changes in the period between WHEEL pulse events indicate a change in speed, and thus an acceleration or deceleration. This information is used to separate the gravitational force due to pitch from the total acceleration read by the accelerometer.

When the vehicle is moving, the wheel and crank switches will be closed for relatively brief periods, so current draw through the pull-up resistors is small when averaged over time. If the vehicle stops and the wheel or crank stops with its respective switch closed, the current draw will continue until the switch re-opens, thereby shortening battery life. If the MCU determines that a magnetic switch has been closed for a long time with no activity on certain other sensor lines, the MCU forces line REEDPWR low to eliminate current flow from the battery through resistors R26 and R27. The MCU periodically pulses REEDPWR to detect if the switch is still closed, or in one embodiment waits for the user to reactivate the system with a button press. In another embodiment other sensors are polled for activity. In one embodiment a sensor is connected with a certain input to the MCU, which input generates an interrupt resulting from change. Diodes D2 and D3 and resistors R28 and R29 protect the MCU inputs from voltage transients possibly picked up on long wires to wheel or crank switches.

Figure 10:
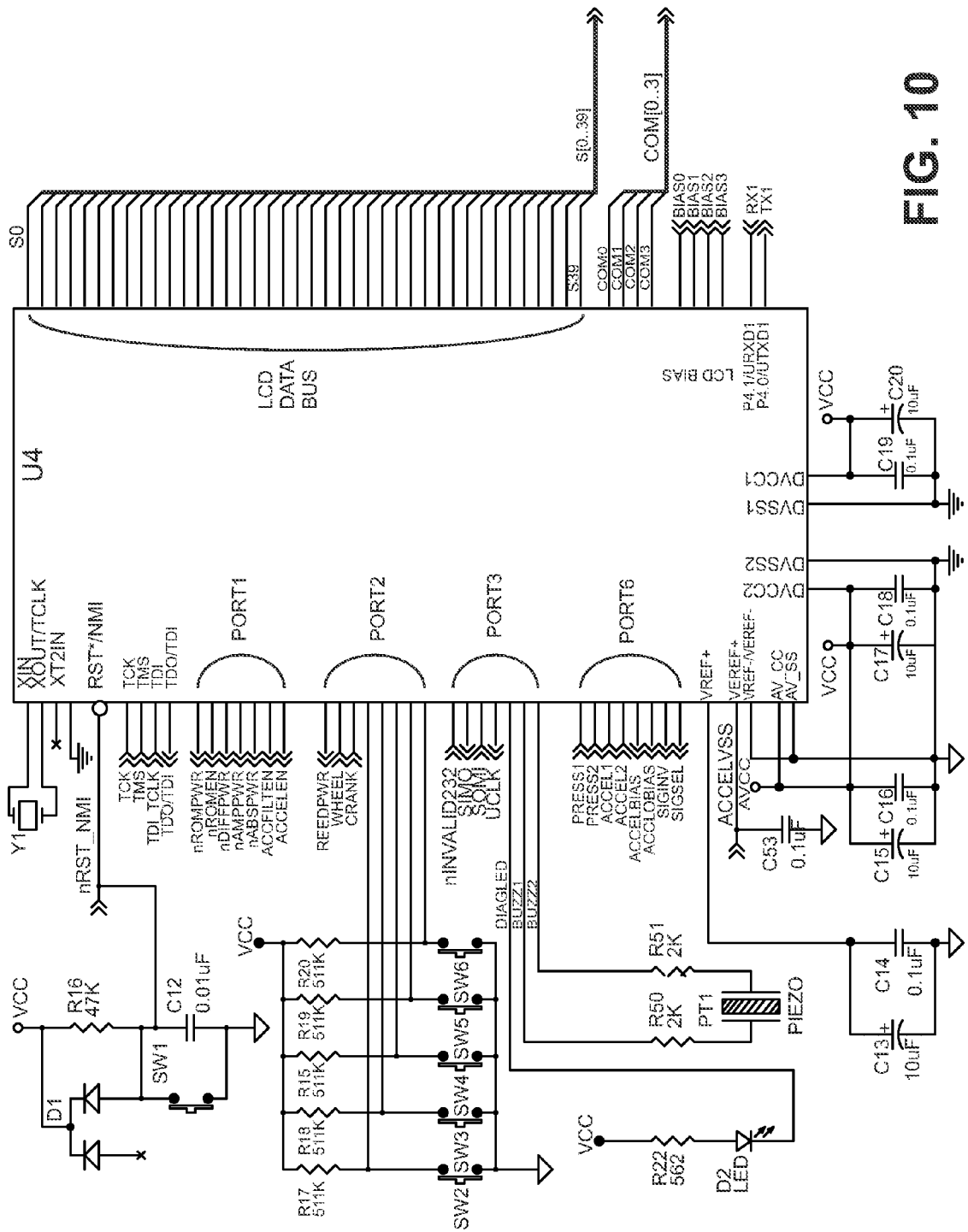
FIG. 10 is a schematic of connections to a microcontroller in another embodiment of the invention.
Figure 12:
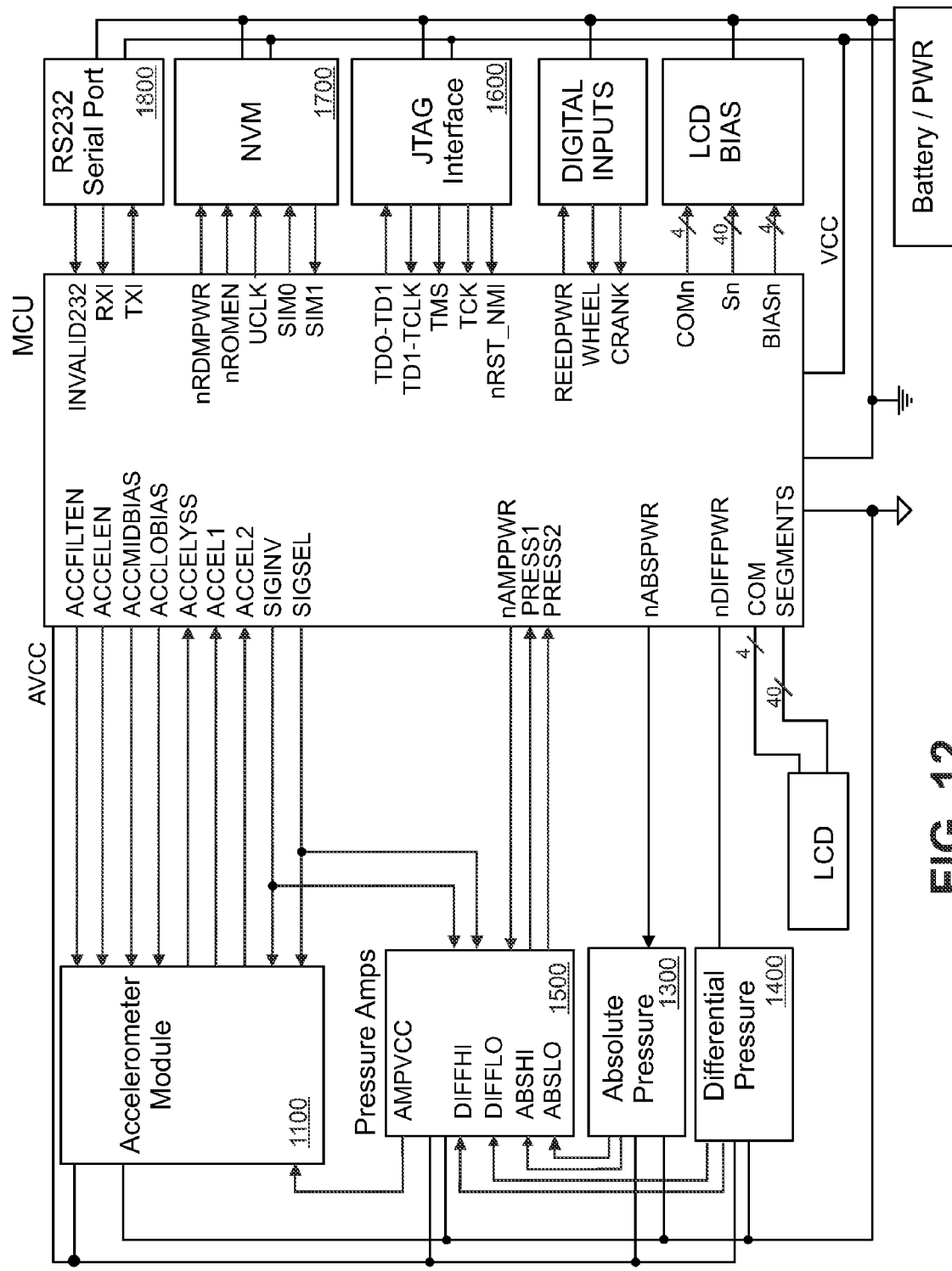
FIG. 12 is a top level schematic, indicating the connections between major functional blocks of one embodiment of the invention.

Connections between the functional blocks comprising another embodiment of the invention are shown in FIG. 12. FIG. 10 details circuit connections for the microcontroller in the embodiment of FIG. 12. LED D2 illuminates the display in low ambient light conditions. Piezoelectric buzzer PT1 provides audio feedback and alerts the user to events and conditions such as a display screen change; meeting, exceeding, or missing a training range or goal; weather changes, or an alarm to deter theft.

Lines nROMPWR, NROMEN, SIMO, and UCLK connect MCU 1000 to a nonvolatile storage system 1700, such as that shown in FIG. 17. A nonvolatile storage system provides for storage of historical, ride, calibration, customization, or other data to be saved when system power is turned off. In the embodiment shown in FIG. 17, a serial EEPROM is used as a nonvolatile storage device. Any nonvolatile storage solution, including battery backup or keep-alive of a volatile storage device, may be used.

Lines RX1, TX1, and nINVALID232 connect from MCU 1000 to an RS232 serial port 1800 of FIG. 18. The serial port provides for communications with an external computer or other external device for transfer of ride data, system setup, customization information, firmware updates, and other functions requiring data exchange with the MCU. Line nINVALID232 is asserted by transceiver U9 to indicate valid data is present on transceiver input lines. Transceiver U9 as shown in FIG. 18 is configured to remain on whether or not valid data is present on transceiver input lines. Connector J5 provides an optional DB9 interface for serial data communications with an external device.

In one embodiment lines TDO/TDI, TDI_TCLK, TMS, TCK, and nRST/NMI connect MCU 1000 in FIG. 10 to connector J4 in a JTAG interface 1600 in FIG. 16. The JTAG interface via connector J4 provides means for MCU programming, testing, entering calibration values, or other operations. One skilled in the art will know of other methods for programming and testing. For example, the MCU may have external storage for constants, calibration, setup, or program storage.

Figure 11:
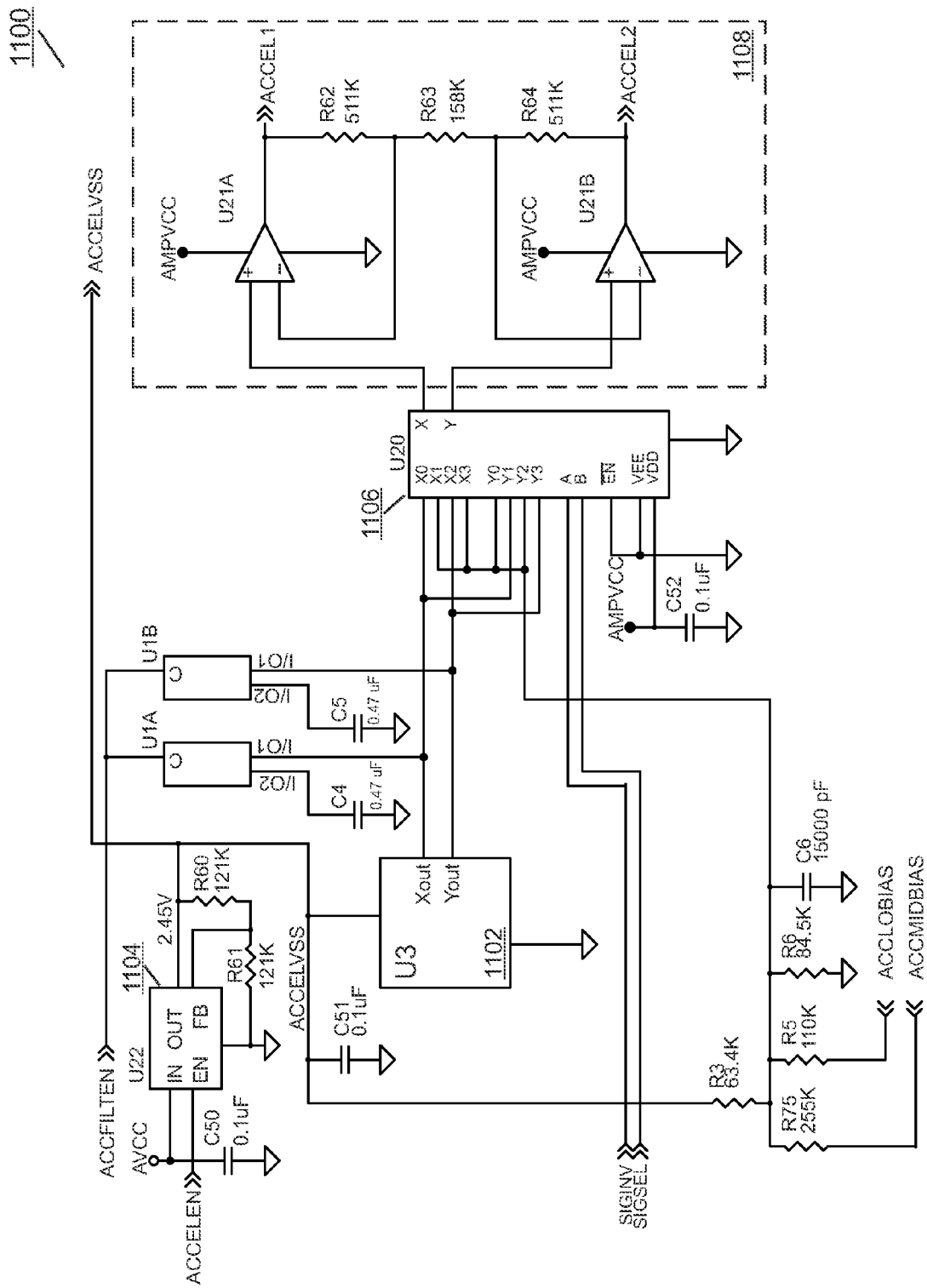
FIG. 11 is a schematic of a module which provides signals related to acceleration of a vehicle.

In one embodiment, both outputs of a dual-axis accelerometer are provided by acceleration module 1100, as shown in FIG. 11. The x-axis signal of accelerometer U3 1102 is used to determine tilt and forward acceleration of the vehicle, as previously described. In one embodiment the Y-axis signal is correlated with the x-axis signal by software running in MCU 1000 to determine pedaling cadence. In some embodiments, the y-axis signal is responsive to changes in vehicle direction, which is used for recording or guiding the vehicle's path. An acceleration signal may also be used a for a theft-deterrent alarm input.

A signal on line ACCELEN from MCU 1000 to the enable input terminal EN of voltage regulator U22 1104 in FIG. 11 turns power to the accelerometer on and off. Use of a voltage regulator diminishes changes in accelerometer sensitivity due to supply voltage changes. Line ACCELVSS, the regulated supply voltage output of U22, connects to a resistor divider network formed by R3, R75, R5, and R6. Lines ACCLOBIAS and ACCMIDBIAS are connected from MCU 1000 to the resistor divider and are individually controlled to float or be driven low to generate one of three different reference voltages. The MCU chooses the reference voltage which most closely matches the inherent zero g offset voltage of the particular sensor installed in the circuit, since zero g offset voltages may vary from part to part. A single reference voltage is used for both the x-axis and y-axis accelerometer channels, since only one axis is measured at a time. The reference voltage ACCELVSS also connects to the ADC voltage reference input of MCU 1000.

Dual 4:1 differential analog multiplexer U20 1106 decodes address signals SIGINV and SIGSEL to determine whether the x-axis or y-axis accelerometer signal from U3 1102 is connected as a differential signal to the inputs of differential amplifier 1102. The outputs of differential amplifier 1102, signals ACCEL1 and ACCEL2, are provided to an input port of the MUX to the internal ADC in MCU 1000. U20 1106 also functions as a commutating switch to swap input signals to differential amplifier 1102 for the purpose of nulling amplifier offset errors. To null amplifier offset errors, MCU 1000 first measures the difference between differential signals ACCEL1 and ACCEL2 while driven by either the x-axis or y-axis signal as selected by SIGINV and SIGSEL. SIGSINV and SIGSEL are then changed to swap the high side of the accelerometer differential signal pair with the low side. MCU 1000 again computes the difference between ACCEL1 and ACCEL2 and sums this value with the first difference computed for ACCEL1 and ACCEL2. The offset error present in the first difference is the same magnitude as the offset error in the second difference, but opposite in sign, so when the two differences are summed the offset errors cancel. The sum of the two differences is twice the value of the difference between ACCEL1 and ACCEL2 for an ideal amplifier with no offset error. This procedure is performed independently for the x-axis signal and the y-axis signal.

Signal ACCFILTEN in FIG. 11 enables a pair of bilateral switches U1A and U1B to connect low pass filters to the output lines of accelerometer U3 1102. Capacitors C4 and C5 form the low pass filters in conjunction with the internal resistance of the U3 1102 sensor outputs. Capacitance values are chosen to permit the filter to settle to less than ½ bit resolution for a 12-bit ADC in the time between consecutive samples. ACCFILTEN is controlled by MCU 1000 to disconnect the capacitors during accelerometer sensor power down, thereby conserving charge in the capacitors and reducing the next sample's settling time.

Figure 14:
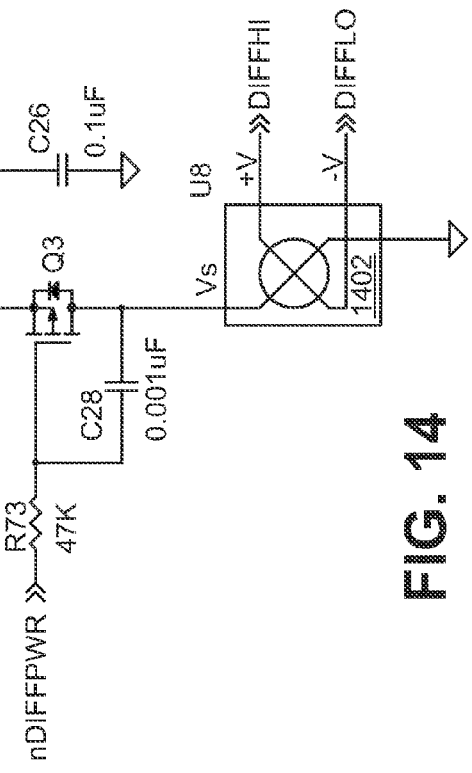
FIG. 14 is a schematic of a module which provides signals related to differential pressure.
Figure 13:
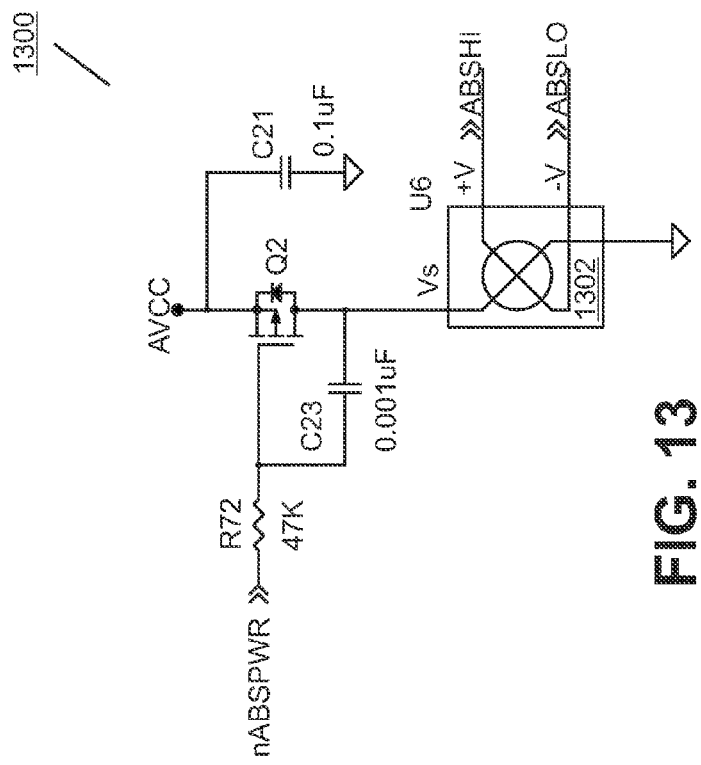
FIG. 13 is a schematic of a module which provides signals related to absolute pressure.

Pressure sensor connections are shown in FIG. 13 for an absolute pressure sensor module 1300 and FIG. 14 for a differential pressure sensor module 1400. In FIG. 13, signal nABSPWR enables power to sensor U6 1302. Sensor U6 1302 provides a differential signal approximately proportional to atmospheric pressure on lines ABSHI and ABSLO. Signal nDIFFPWR controls power to sensor U8 1402 in a similar manner as shown in FIG. 14. Sensor U8 1402 provides a differential signal approximately proportional to differential pressure on lines DIFFHI and DIFFLO. The absolute and differential pressure signals are presented unfiltered to amplifier block 1500.

Figure 15:
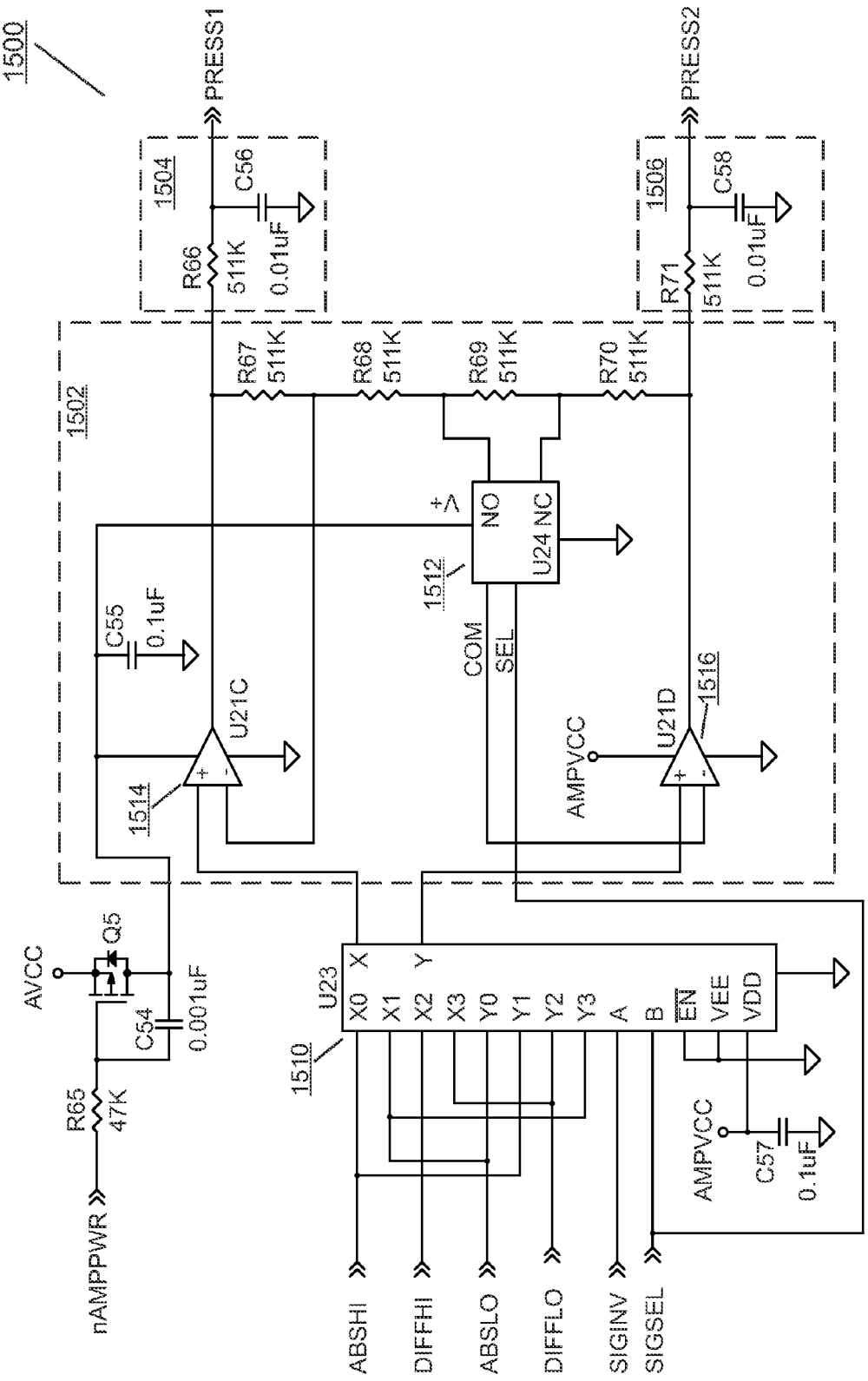
FIG. 15 is a schematic of a module which amplifies and filters differential signals.

FIG. 15 illustrates an embodiment of an amplifier circuit wherein amplification of dynamic pressure signals and absolute pressure is provided. Only one mode of pressure (differential or absolute) is conditioned and measured at a time. Absolute pressure sensor lines ABSHI and ABSLO and differential pressure sensor lines DIFFI and DIFFLO are connected to separate sets of inputs on dual 4:1 analog differential multiplexer U23 1510. MCU 1000 controls address lines SIGINV and SIGSEL to select whether ABSHI and ABSLO or DIFFHI and DIFFLO are provided by multiplexer U23 1510 to differential amplifier 1502 inverting and noninverting inputs.

U23 1510 also functions as a commutating switch to swap input signals to differential amplifier 1502 for the purpose of nulling amplifier offset errors. MCU 1000 controls the swapping of inverting and noninverting inputs to amplifier 1502 and calculates the resulting differences between PRESS1 and PRESS2, similar to the method previously described for nulling amplifier errors in differential amplifier 1102.

Absolute and differential pressure sensors may have different sensitivities and therefore different amplifier gain requirements. 2:1 analog multiplexer U24 in FIG. 15 connects the noninverting input of one of the input stages with differential amplifier 1502 to one of two locations on the resistor network consisting of R67 to R70, thereby changing the effective overall differential gain of the amplifier. Gain is set to a high value when MCU 1000 drives line SIGSEL high. Gain is set to a lower value when MCU 1000 drives line SIGSEL low. Values of resistors R67 to R70 are chosen such that the differential gain of amplifier 1502 is approximately 2,300 for the differential pressure sensor and approximately 175 for the absolute pressure sensor. The differential output signals of amplifier 1502 pass through low pass filters 1504 and 1506 and are then connected to lines PRESS1 and PRESS2. Lines PRESS1 and PRESS2 are connected with an input port for the internal ADC in MCU 1000.

MCU 1000 turns power to amplifier 1500 on and off by controlling line nAMPPWR. Asserting a signal on line nAMPPWR turns on power to multiplexers U23 1510 and U24 1512 and operational amplifiers U21C 1514 and U21D 1516.

Figure 19:
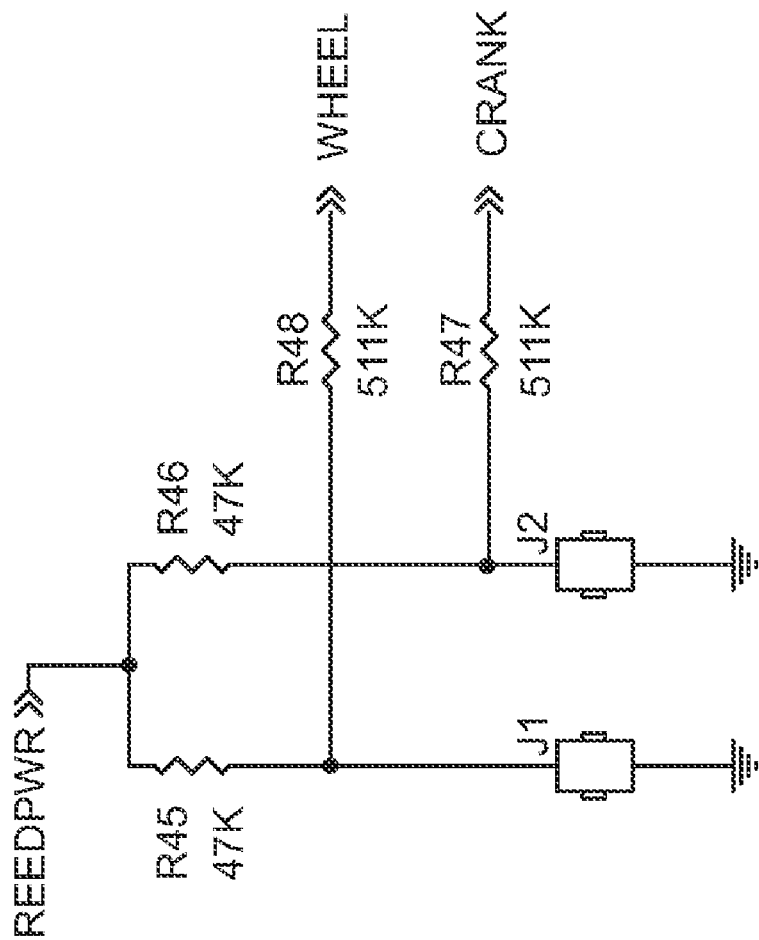
FIG. 19 is a schematic of a circuit which provides timing data from a crank or from a wheel on a vehicle, such as a bicycle.

Another embodiment of wheel and crank reed switch input circuit is shown in FIG. 19. Lines REEDPWR, WHEEL, and CRANK connect to MCU 1000. In one embodiment, the circuit relies on integral diode clamps on the input pins of the MCU for transient protection. The values of resistors R47 and R48 are selected to prevent excessive current flow through the diode clamps in the MCU. Signal definitions and functions for REEDPWR, WHEEL, and CRANK remain the same as those defined in an earlier section of this specification.

In one embodiment some sensor circuits are calibrated to improve the overall accuracy of the systems. Gain and offset values for pressure, acceleration, and temperature sensors are determined by a calibration method comprising exposing the system to two or more controlled pressures, accelerations, and temperatures respectively. For pressure and acceleration the no-pressure (vacuum) and no-acceleration (at rest, vertical) conditions are determined by calculations extending the calibration data to find the "zero offset" values. The results of calibrations are ADC readings which are stored in memory. One may optionally calibrate to more conditions and determine a calibration curve throughout the operating range of a sensor. A lower cost system with less accuracy may use one point for calibration or no calibration but rather component datasheet and design values.

Other information is needed by the system. For example, the user enters the weight of the vehicle plus himself and for the wheels. In some embodiments the system is updated for such factors as ambient pressure, altitude, or temperature by user entry.

In one embodiment the user recalibrates the tilt sensing circuit. This procedure removes the effect of the user possibly having mounted the unit other than exactly parallel to the earth or changes in the sensor circuit over time. The user holds the unit still for a few moments while the acceleration signal is converted by the ADC. The user then places the vehicle in the same spot after rotating it 180 degrees horizontally and the reading taken again. The average between the two readings is the value for no acceleration, or zero g.

In some embodiments we estimate an average rolling friction and a scale factor relating frontal area and drag coefficient to dynamic pressure. These values are improved upon in one embodiment by a "coast-down calibration" procedure. This involves the vehicle gaining a certain minimum (high) speed, then stopping all pedaling or power input and letting the vehicle coast down to a predetermined maximum (low) speed while the rider maintains his usual riding position. During the coast-down period the system records readings used by a curve fitting technique. The curve fitting step is done to determine static (rolling friction) and dynamic (wind) forces. The aerodynamic factor is the overall constant relating Q to drag force. The aerodynamic factor is the product (drag coefficient)*(frontal area), though neither is known separately. Weight and acceleration are used to remove the effect of slope during the coast-down calibration procedure.

Details of one embodiment of the tilt and coast-down procedures are presented in Appendix I. Tilt is calibrated first, then coast-down. During coast-down, data is collected, then the data analyzed after the coasting step is completed. In the embodiment shown, the data is fitted using a linear regression math process. One skilled in the art will know of other curve fitting techniques which may be used.

Figure 20:
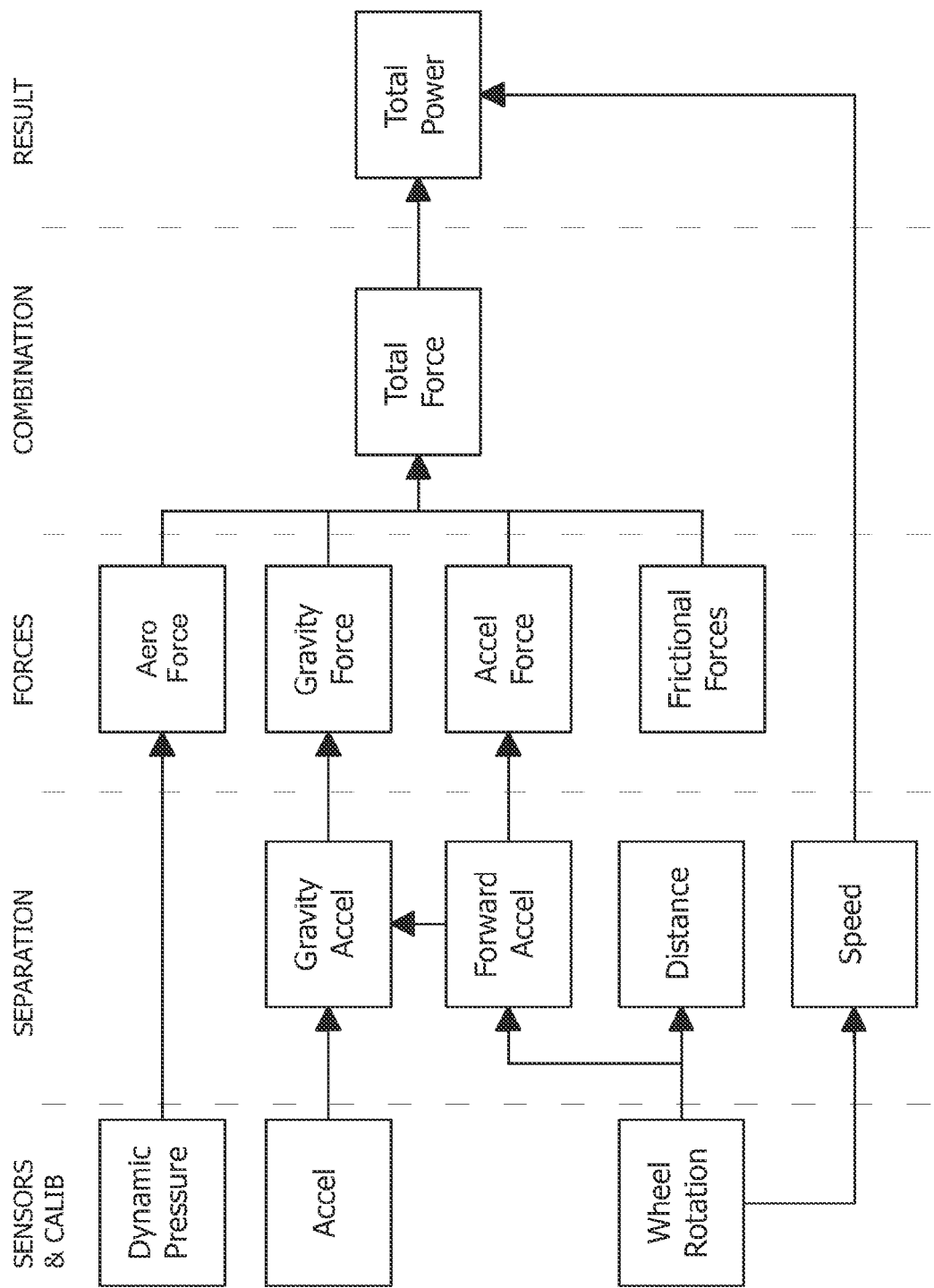
FIG. 20 is a conceptual presentation of the logical flow of the firmware.

Firmware in the MCU processes sensor, timing, scale and calibration data to determine, record, or present certain information to the viewer. FIG. 20 is a conceptual presentation of the logical flow of the firmware. In the section labeled "Sensors", instant absolute pressure, differential pressure, acceleration, and wheel rotation sensor readings are taken. Any calibration or scale factors are taken into account (not shown).

Appendix II presents one embodiment of firmware for using the (adjusted) sensor readings, referred to in FIG. 20 as the "Separation" section. Wheel rotation data is used to determine speed and to add to an accumulated distance. Any change in rotation rate is used to determine forward acceleration, which is then subtracted from the accelerometer data to determine the gravity force contribution. As previously described, data resulting from other means for determining ground speed may be used instead of wheel rotation timings. In the section labeled "Forces", detailed in Appendix III, four force elements are determined. In the "Combination" section (also included in Appendix III) the four forces (aerodynamic drag, change in altitude, rolling friction, and acceleration) are combined. Note the factor "DriveEff", which is related to drive train efficiency. This efficiency is related to chain friction, hub friction, quality of lubrication and the like. A quality bicycle in good condition and well maintained may have an efficiency of about 97%. A bicycle of low quality or in poor condition may be around 85%.

In calculating forward acceleration the term "TotalEffMass" is used, which term differs slightly from "TotalMass" due to the wheel and tire angular moment when converted into linear inertia. The difference comprehends the force required for angular acceleration of the wheels. This is a rather small factor compared to the total mass of a vehicle plus a rider (and accessories). One estimate would be the mass of the rims, tires, and one third of the spokes, but a large error in this estimate is still a small percent of the total.

Finally, per the "Result" section of FIG. 20, total force is multiplied by vehicle speed to yield total power.

The pseudocode presented in the appendices is for illustration purposes. One skilled in the art would be able to develop code for any suitable MCU using any suitable programming language from the pseudocode.

One skilled in the art will recognize from the above that the present invention can be extended to any number of different combinations or subsets of sensing, computing, and storage elements. Accordingly, the present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

Unless expressly stated otherwise herein, ordinary terms have their corresponding ordinary meanings within the respective contexts of their presentations, and ordinary terms of art have their corresponding regular meanings.

APPENDIX I

```
//-------------------------------------------------------------
// © COPYRIGHT 2005 VELOCOMP, LLP
//       ALL RIGHTS RESERVED
//-------------------------------------------------------------
// Global variables
//-------------------------------------------------------------
// Sensor readings, converted and scaled
Temperature;            // degrees C.
DynamicPressure;        // Pascals = 1/1000 kPa
AccelerometerGs;        // g from the accelerometer
// Derived values
SlopeAngle;                     // angle of hill slope
Gradient;               // sin(SlopeAngle), −1.00 to 1.00
FwdAccelGs;                     // g of forward acceleration
GravityAccel;           // g due to hill slope
Distance;               // meters
WheelRevs;                      // wheel revolutions
Speed;                          // vehicle speed, meters/sec
//-------------------------------------------------------------
// Stored coefficients and calibration values
//-------------------------------------------------------------
TotalMass;      // Bike and rider Kg, entered by rider
TotalEffMass;   // Bike, rider and effective mass of wheel
moment, Kg
DriveEff; // Drive efficiency < 1, due to chain friction
Froll;          // Rolling resistance, Newtons, from coast
down test
```

APPENDIX I-continued

```
TireCirc;  // Tire circumference, meters
// Aero force / pressure, combines frontal area and drag
coefficient
Kaero;                    // Newtons / Pascal, from coast down test
// Constants
Kgravity = 9.80;          // Gravitational acceleration, m/sec^2
//**************************************************************
//              CALIBRATION PROCEDURES
//**************************************************************
//              TILT CALIBRATION BY USER
//**************************************************************
// This determines the true angle of the accelerometer as
mounted if the bike
// is on level ground. Since the ground may not be perfectly
level, two
// readings are taken with the bike facing opposite
directions on the same
// spot. Adding the two readings cancels any non-level angle
of the ground.
TiltCal( ) {
    Temp variables Angle1, Angle2;
    // Tell user to hold bike still
    Message ("Hold Still");
    Angle1 = arcsin(AccelerometerGs);      // Read angle
    // Tell user to turn bike around and hold still again
    Message("Turn 180 degrees");
    WaitForKeyPress( );
    Message("Hold Still");
    Angle2 = arcsin(AccelerometerGs);      // Read angle
    LevelAngle = (Angle1 + Angle2) / 2;
}
//**************************************************************
//              COAST DOWN CALIBRATION PROCEDURE
//**************************************************************
// Coast down procedure to determine aerodynamic drag and
rolling resistance
// The bike is allowed to coast from a high to a low speed
while force and
// sensor data is collected. The missing coefficients are
then derived by
// fitting a straight line to the collected data.
// Note that DriveEff is not used in coast down since the
drivetrain (chain)
// is not moving.
CoastDown( ) {
    // Tell user to reach Highspeed
    while (Speed < Highspeed)
        Message("Go Faster");
    Message("Coast");         // tell user to stop pedaling
    // Fill an array of data samples
    // The model is:
    // TotalForce = Faero( ) + Froll + Fslope( ) + Faccel( ) =
0 while coasting
    // If the device has been properly leveled, then we can
calculate both
    // Fslope( ) and Faccel( ), but we are still missing Froll
and the
    // aerodynamic drag factor Kaero where Faero = Kaero *
DynamicPressure
    // So we just need to record the total of known forces
and the
    // DynamicPressure at each data point:
    // y = f(DynamicPressure) = Kaero * DynamicPressure +
Froll
    //                        = -(Fslope( ) + Faccel( ))
    // Fitting the best straight line to the resulting data
gives us Kaero and
    // Froll.
    // Two parallel arrays, one for total known forces, the
other for pressure
    DynPress[ ];
    OtherForces[ ];
    i = 0;
    while (Speed > LowSpeed) {
        DynPress[i] = DynamicPressure;
        OtherForces[i] = -(Fslope( ) + Faccel( ));
        i = i + 1;
    }
    // Low speed reached, tell user to stop.
    Message("Done Coast");
    // Process the data using linear regression
    // Best fit for y(x) = ax + b is derived by:
    //     Define:
    //         Sx = sum(x)
    //         Sy = sum(y)
    //         t(i) = x(i) - Sx/N = x(i) - Avg(x)
    //         Stt = sum(t^2)
    //         Sty = sum(t*y)
    //         where the sums are taken over all N points
    //     then:
    //         b = Sty/Stt
    //         a = (Sy - b * Sx) / N
    //
    DataPoints = i;
    i = 0;
    Sx = 0;
    Sy = 0;
    while (i < DataPoints) {
        Sx = Sx + DynPress[i];
        Sy = Sy + OtherForces[i];
        i = i + 1;
    }
    AvgPress = Sx / DataPoints;
    i = 0;
    Stt = 0;
    Sty = 0;
    while (i < DataPoints) {
        t = DynPress[i] - AvgPress;    // no need for
an array of t
        Stt = Stt + t * t;
        Sty = Sty + t * OtherForces[i];
        i = i + 1;
    }
    Froll = Sty / Stt;
    Kaero = (Sy - Froll * Sx) / DataPoints;
}
```

APPENDIX II

```
//--------------------------------------------------------------
// © COPYRIGHT 2005 VELOCOMP, LLP
//         ALL RIGHTS RESERVED
//--------------------------------------------------------------
//**************************************************************
//              SENSOR SIGNAL SEPARATIONS
//**************************************************************
// Separate accelerometer reading into gradient and forward
acceleration
ProcessAccelerometer( ) {
    // Remove forward acceleration as seen at the wheel
speed sensor
    GravityAccel = AccelerometerGs - FwdAccelGs;
    // Correct for tilt of mounted sensor on level ground
    // GravityAccel = sin(SlopeAngle + LevelAngle) g, so:
    SlopeAngle = arcsin(GravityAccel) - LevelAngle;
    Gradient = sin(SlopeAngle);
}
// Convert wheel switch inputs into speed, distance and
acceleration
ProcessWheelSwitch( ) {
    // Add one more wheel rev to the recorded distance
    WheelRevs = WheelRevs + 1;
    Distance = WheelRevs / TireCirc;       // meters
    // Use a real time counter to time periods between wheel
pulses
    Period = CurrentTime( ) - LastWheelTime;     // seconds
    LastWheelTime = CurrentTime( );
    Speed = TireCirc / Period;                   //
meters /second
    // Calculate acceleration or deceleration in g
    DeltaSpeed = Speed - LastSpeed;              // m/sec
    LastSpeed = Speed;                           // record for
next time
    FwdAccel = DeltaSpeed / Period;              // m/sec^2
    FwdAccelGs = FwdAccel / Kgravity;            // g
}
```

APPENDIX III

```
//---------------------------------------------------------
// © COPYRIGHT 2005 VELOCOMP, LLP
//         ALL RIGHTS RESERVED
//---------------------------------------------------------
//**********************************************************
//              FORCE AND POWER CALCULATIONS
//**********************************************************
// Propulsive force calculation, Newtons
Fpropulsive( ) {
    return (Faero( ) + Fslope( ) + Froll + Faccel( ))/DriveEff;
}
// Aerodynamic force calculation, Newtons
Faero( ) { return Kaero * DynamicPressure; }
// Gravitational force calculation, Newtons
Fslope( ) { return TotalMass * Kgravity * Gradient; }
// Forward acceleration force calculation, Newtons
Faccel( ) { return TotalEffMass * FwdAccelGs; }
Watts( ) { return Fpropulsive * Speed; }
```

I claim:

1. An apparatus for sensing forces upon a vehicle, the vehicle including at least two wheels, the apparatus comprising:

a microcontroller;

an analog to digital converter including an analog input port, the analog to digital converter providing to the microcontroller a digital version of an analog input port signal;

a MUX with multiple selectable analog inputs and an output port, the output port of the MUX connected to the analog input port of the analog to digital converter;

a plurality of analog sensors, the output signal of each analog sensor independently connected to an analog input of the MUX, wherein the plurality of analog sensors includes a differential pressure module responsive to differential pressure, and an acceleration module responsive to acceleration in the direction of travel of the vehicle;

means for detecting ground speed of the vehicle;

means for providing dynamic pressure to the differential pressure module; and a display system connected with the processing unit.

2. The apparatus of claim 1, further comprising a memory system for storing data, the memory system connected to the processing unit.

3. The apparatus of claim 2, wherein the memory system comprises an electronic memory device.

4. The apparatus of claim 1, wherein the display system comprises a liquid crystal display device.

5. The apparatus of claim 1, wherein the acceleration sensor is a MEMS.

6. The apparatus of claim 1, wherein the acceleration sensor is a ball-in-tube type.

7. The apparatus of claim 1, further comprising an absolute pressure module.

* * * * *